United States Patent [19]
Cox et al.

[11] Patent Number: 5,339,948
[45] Date of Patent: Aug. 23, 1994

[54] CONVEYOR APPARATUS WITH UNLOADER

[75] Inventors: Gary B. Cox, Philo; Dennis R. Reifsteck, Pesotum; Gregg A. Hills, Rantoul; Lynn R. Fenter, Urbana, all of Ill.

[73] Assignee: Kraft General Foods, Inc., Northfield, Ill.

[21] Appl. No.: 992,720

[22] Filed: Dec. 18, 1992

[51] Int. Cl.⁵ .............................................. B65G 47/74
[52] U.S. Cl. .................................. 198/635; 198/803.15
[58] Field of Search ............ 198/599, 635, 637, 803.15

[56] References Cited

U.S. PATENT DOCUMENTS

| | | | |
|---|---|---|---|
| 1,242,817 | 10/1917 | Lally | 198/803.15 |
| 2,210,529 | 8/1940 | Dostal | 198/803.15 |
| 2,288,062 | 6/1942 | Ashlock | 198/635 |
| 2,949,995 | 8/1960 | Welch | 198/803.15 |
| 3,004,651 | 10/1961 | Manspeaker et al. | 198/635 |
| 3,084,781 | 4/1963 | Merrill | 198/635 |
| 3,845,851 | 11/1974 | Decker et al. | 198/637 |

*Primary Examiner*—Joseph E. Valenza
*Attorney, Agent, or Firm*—Fitch, Even, Tabin & Flannery

[57] ABSTRACT

A conveyor suspends containers from their upper portions, leaving their lower portions exposed. A curved deflector plate is located beneath the conveyor. Containers carried by the conveyor contact the deflector plate and are at least partly dislodged from the conveyor.

3 Claims, 3 Drawing Sheets

100  # CONVEYOR APPARATUS WITH UNLOADER

BACKGROUND OF THE INVENTION

1. Field of the Invention

The present invention pertains to conveyor apparatus having unloader mechanisms incorporated therewith.

2. Description of the Related Art

Many types of conveyor arrangements in use today have a solid or substantially solid belting on which products are carried. Such belting must be flexible so as to be wound about a series of rollers in an endless fashion. Typically, products are loaded and unloaded at ends of the belting arrangement. However, other types of conveyors are employed in the mass manufacture and packaging of products. For example, many products in the food industry today are packaged in "film-wrapped" packages. For example, snack products, jellies, and soup products are packaged in open top plastic containers with upper ends sealed with a plastic film. Prior to sealing, these containers are typically carried to a filling station, and then to testing and sealing stations before off-loading for further packaging. It is often desirable to maintain such containers in a specified array for automated handling and processing. Accordingly, it has been found expedient in some instances to provide a conveyor in which pockets are provided for receiving individual containers. Such pockets may be formed in a conveyor belt having an open grid work configuration, rather than a solid surface. Improved arrangements for unloading products from these types of conveyors have been sought.

SUMMARY OF THE INVENTION

It is an object of the present invention to provide a conveyor for transporting an array of individual product packages, and for unloading the packages at a desired point in the conveyor travel.

Another object of the present invention is to provide conveyor apparatus of the above-described type in which the product packages are suspended by the conveyor, with lower ends of the product packages being exposed.

Yet another object of the present invention is to provide conveyor apparatus for open top containers filled with a liquid product, and for unloading such containers so as to avoid spilling liquid on the conveyor components. Such features are particularly important in the food handling industry where cleanliness of the food handling equipment must be continuously maintained.

These and other objects according to principles of the present invention are provided in conveyor apparatus for carrying containers having a body with upper and lower portions, the lower portion including a lower end, the apparatus comprising:

- a conveyor belt defining openings for receiving and supporting at least the lower portions of said containers, with the lower ends of the containers extending below the conveyor belt;
- means for mounting the conveyor belt for travel in a downstream direction; and
- a deflector member located beneath the conveyor belt and extending in the direction of conveyor belt travel, the deflector member having an upstream end spaced a preselected greater distance from the conveyor belt and a downstream end spaced closer to the conveyor belt so that at least a portion of the deflector member interferes with the lower ends of containers carried on the conveyor belt, deflecting the lower ends of the containers toward the conveyor belt to partly dislodge the containers from the conveyor belt.

DETAILED DESCRIPTION OF THE PREFERRED EMBODIMENTS

Figure 1:
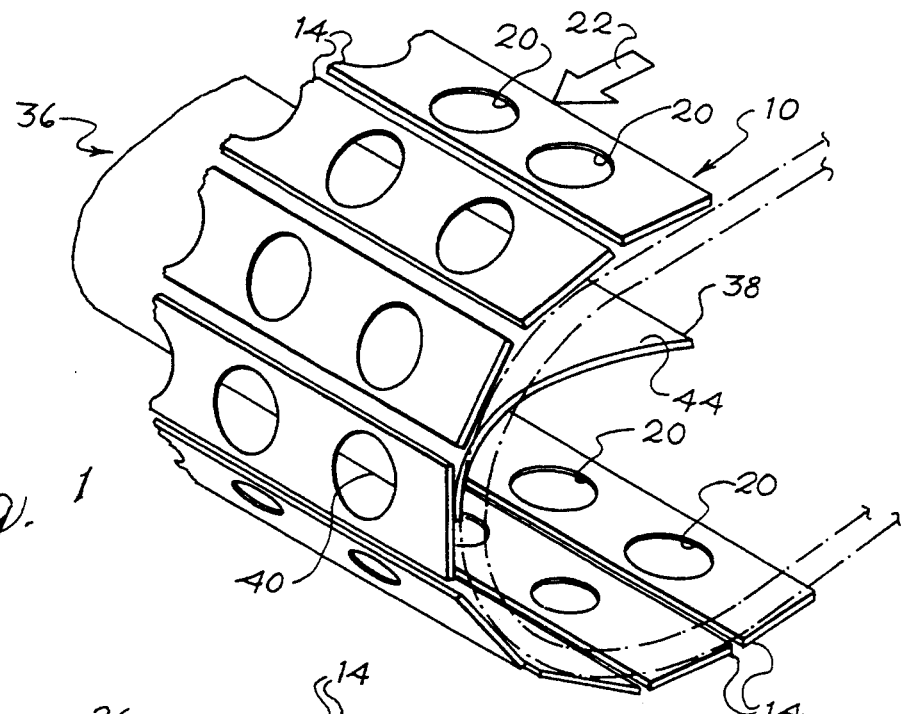
FIG. 1 is a fragmentary perspective view of conveyor apparatus according to principles of the present invention.
Figure 2:
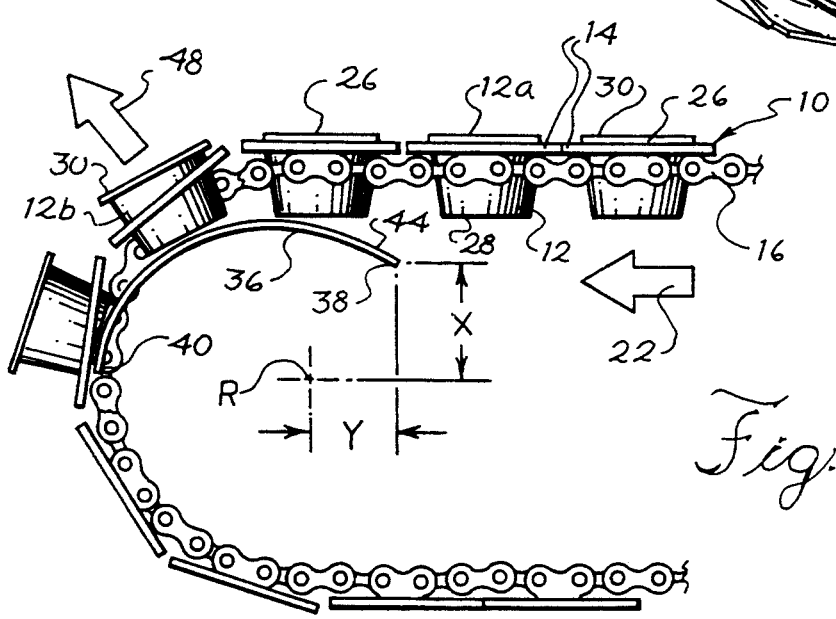
FIG. 2 is a side elevational view thereof, showing a first sized container.

Referring now to the drawings and initially to the FIGS. 1 and 2, the conveyor assembly generally indicated at 10 carries an array of containers 12. The conveyor assembly 10 includes a series of tables 14 carried on a plurality of laterally spaced chains 16. Together, the plates 14 and chains 16 comprise a flexible support or conveyor belt, which is free to bend or flex in vertical directions, as illustrated in the FIGURES. Although the conveyor is described herein as having a roller at one end so as to rotate the conveyor plates about an arcuate path, the present invention can also be used with conveyor path portions which are not circular, but rather which have non-circular curvatures. The tables 14 define apertures 20 and each table 14 preferably includes a single row of apertures placed side-by-side. As can be seen in FIG. 1, the apertures of each table are preferably aligned in registry along the direction of conveyor travel indicated by arrow 22. With reference to FIG. 2, the conveyor can be seen to have an upper support run portion, which is preferably horizontal, a lower return run portion and a vertically inclined discharge end of part circular configuration.

Referring to FIG. 2, the containers 12 have an upper end 26 and a lower end 28. The containers 12 have a truncated, conical configuration with the lower end 28 comprising a flat bottom wall and the upper end 26 comprising an outwardly extending lip or rim portion 30 formed around an upper opening. In the preferred embodiment, containers 12 comprise plastic cups formed by a plastic molding operation. The apertures 20 of the preferred embodiment are generally circular, but could have other configurations, if desired. Apertures 20 are dimensioned slightly smaller than the rim 30 at the upper ends 26 of the container. The containers may thereby be dropped in apertures 20 with the rims 30 resting on table portions surrounding the apertures 20, preventing the containers 12 from falling through the conveyor tables.

As can be seen in FIG. 2, the lower portions of containers 12 are exposed, hanging below the conveyor tables. If desired, the apertures 20 could be dimensioned or have their shapes reconfigured so as to engage containers 12 at a point lower than that indicated in FIG. 2, e.g., at a midpoint of the container height. According to one aspect of the present invention, it is preferred that the bottom ends of the containers extend below the conveyor tables 14 for reasons which will now become apparent.

Turning again to FIGS. 1 and 2, conveyor assembly 10 includes a deflector plate generally indicated at 36. The deflector plate has, with reference to arrow 22, an upstream end 38 and a downstream end 40. According to one aspect of the present invention, it is preferred that the upstream end 38 be spaced further away from the conveyor tables 14, and that the downstream end 40 be spaced closer to the conveyor tables. Further, as shown in FIGS. 1 and 2, it is generally preferred that the deflector plate 36 present a continuously curved surface 44 to the bottom ends of the containers.

Preferably, the deflector plate 36 is oriented such that its upstream end 38 remains out of contact with the container bottom ends as they proceed in the direction of conveyor travel. It is generally preferred that the bottom ends of the containers engage the upper surface 44 of deflector plate 36 at a point slightly downstream of edge 38, so as to avoid exerting a force on the containers which is generally parallel to the conveyor table surfaces. It is preferred that the deflector plate 36 offer a low resistance to container movement in this direction so that most, if not all of the force exerted on the containers is in a direction generally normal to the table surfaces (indicated by arrow 48 in FIG. 2).

In the preferred embodiment, containers 12 are filled with a liquid food product in an automated material handling and packaging system. As those skilled in the art are aware, the environment in which the containers are placed must be maintained to relatively high standards of cleanliness. It has been found to be more efficient to prevent food spills on the equipment, rather than to clean the equipment of food spills at a later time. Preferably, the liquid food product is filled in containers 12 at a heated, elevated temperature. When smooth wall, relatively thin, plastic containers are employed, the containers may wedge in apertures 20 and it is important that the containers be quickly and easily dislodged from the conveyor tables, without disturbing the liquid product in the containers. It has been found advantageous in this regard to minimize the ejecting force initially applied to the containers and to quickly build the ejecting force so as to attain maximum deflection at the downstream end of the deflector. As can be seen in FIG. 2, the bottom ends of the containers 12 in contact with deflector plate 36 are pushed with increasingly greater rates of deflection in a direction so as to dislodge the containers from the conveyor tables. It is generally preferred that the rate of increase of such pushing be nonlinear, so as to present a very gradual lifting force at the initial portion of container contact with the deflector.

It has also been found desirable to give the deflector plate 36 a curvature such that the point of contact with the containers travels along the container bottom ends so as to move the dislodging force applied to the bottom ends of the containers. For example, as can be seen in FIG. 2, container 12a has its forward leading corner in engagement with container 36, but the point of contact shifts toward the trailing end of the container as can be seen in the adjacent container 12b where contact has moved to a different point on the container bottom end.

As will now become apparent, by altering the curvature of deflector plate 36 and changing its orientation with respect to the conveyor tables, the ejecting force applied to the container bottom ends can be continuously changing in magnitude and direction. For example, the deflector plate 36 can be shifted with respect to reference point R by changing the X and Y distances, as shown in FIG. 2, drawn with reference to the upstream end 38 of the deflector. Further, the deflector plate 36 could also be rotated with respect to reference point R, and could also take on different shapes, such as those illustrated in FIGS. 4-7, for example. As can be seen in FIG. 2, the container 12 located adjacent to arrow 48 has the upper rim 30 tilted at only a small angle with respect to the upper surface of the conveyor plate. However, as mentioned above, it is generally preferred that most of the ejecting force be generally normal to the conveyor surface.

As can now be seen, a wide range of control of the deflecting forces applied to the containers can be quickly and easily achieved. This is important where a variety of products are handled on the same conveyor system. Different product temperatures and container designs, for example, can affect the wedging forces which must be overcome by the deflector.

A wide control over the deflector design is also important where wedging forces are not involved, as where a container is considerably undersized with respect to the apertures 20. For example, due to properties of the materials in the containers, such as propensity for foaming, it may be important to accelerate the discharge of containers at a prescribed rate, either linear or nonlinear, continuously or discontinuously. In some applications, use of a flat, generally planar deflector plate may be required.

Figure 3:
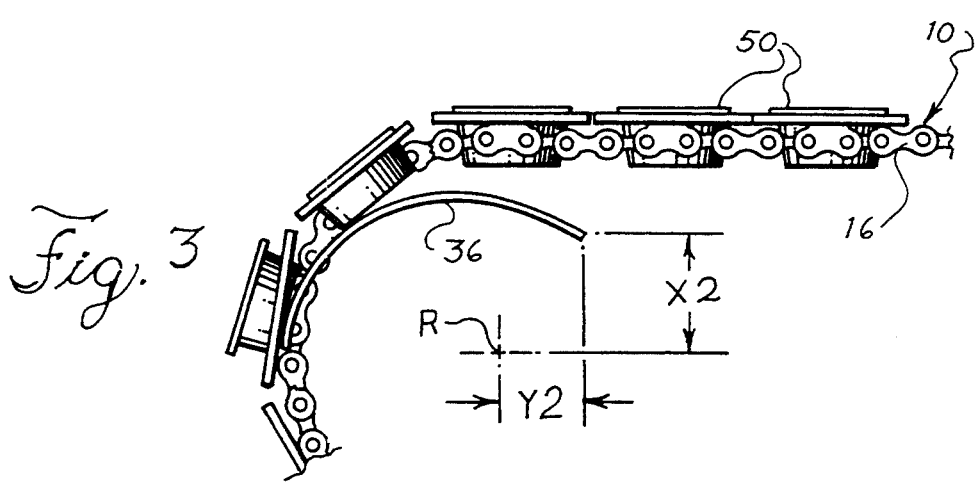
FIG. 3 is a view similar to that of FIG. 2 but showing a second, differently sized container.

Turning now to FIG. 3, conveyor apparatus 10 is shown with a smaller size container 50. Container 50 preferably has the same upper dimensions as container 12, but as can be seen, has a decreased height. With an adjustment in position, the same deflector plate 36 can be used with the smaller sized containers 50. Brackets (not shown in the drawings) can be affixed to deflector plate 36 at its upstream and downstream ends and/or points in between and secured to a framework with threaded fasteners so as to allow the deflector to be adjusted for different sized containers.

Figure 4:
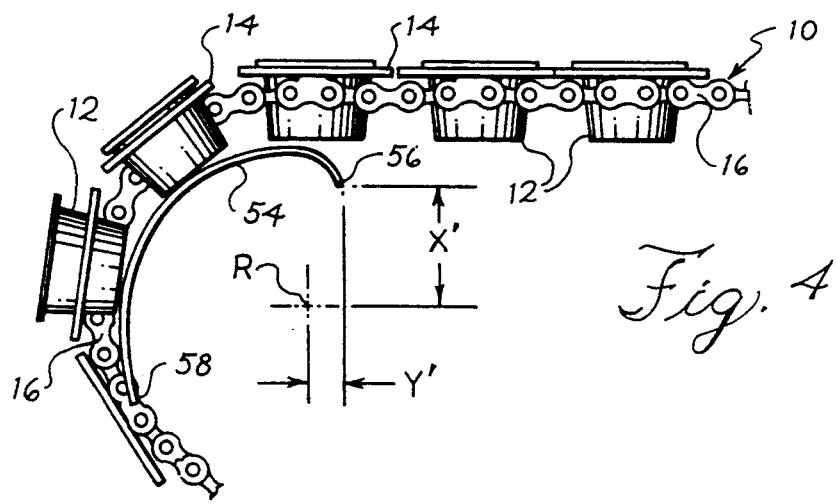
FIG. 4 is a view similar to that of FIG. 2 but showing an alternative deflector plate.
Figure 5:
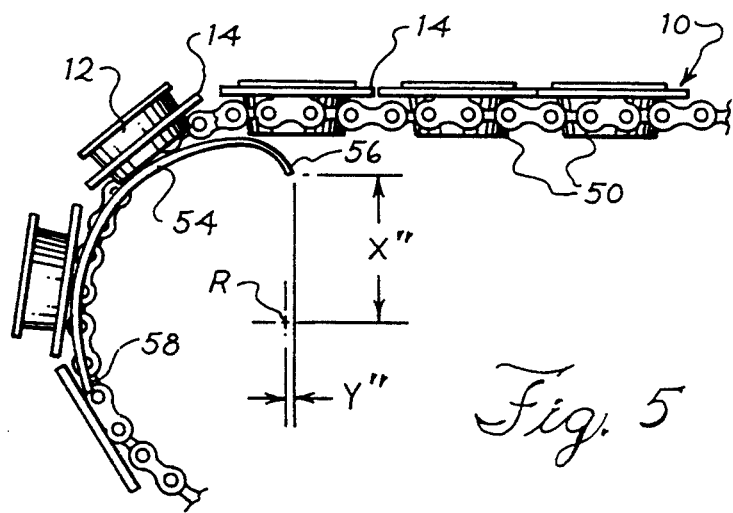
FIG. 5 is a view similar to that of FIG. 4 but showing a differently sized container.

Turning now to FIG. 4, conveyor assembly 10 is shown with an alternate deflector 54, having a shape differing from that of deflector plate 36 discussed above. The deflector 54 has an upstream end 56 more sharply rounded than the remainder of the deflector. The deflector 54 has been oriented so that the trailing end 58 extends further along the downturned curve of the conveyor belt, than in the arrangements of FIGS. 2 and 3, for example. In the preferred embodiment, the conveyor belts are filled with empty containers which are fed to a filling station where the containers on a conveyor plate are filled simultaneously. The conveyor belt is then advanced to a sealing station where the top ends of the containers are closed off. The containers are thereafter tested for leakage, and leaking containers are identified.

The non-leaking containers are removed by apparatus, not shown, leaving leaking containers on the conveyor belt. The containers remaining on the end of the conveyor belt run, as shown in the FIGURES, are unloaded into a special receptacle for further processing. As will be appreciated, the location of the containers remaining at the end of the conveyor belt run are randomly spaced about the conveyor belt, and it has been found efficient to provide deflectors which clear all of the container positions on the conveyor belt. As shown in FIGS. 1-5, for example, the conveyor belt enters a downturned reverse curve at the location where the deflectors are positioned. Accordingly, it is expected that the deflectors would fall out of the conveyor tables, due to gravity. However, as mentioned, the containers may become wedged within the conveyor tables and may not "clear" or cleanly exit the conveyor. Further, as mentioned, when the containers handle food products, it is important that the containers be carefully dislodged to prevent unintentional spills which might require additional attention to procedures routinely employed to clean the conveyor equipment. The arrangement of FIG. 4 provides an extended contact time with the bottom ends of the containers and provides an increased ejecting force at a point in the curve of the conveyor belt when the container tops are oriented more nearly in a horizontal position. When the deflector 54 is used with the shorter containers 50, the deflector is preferably moved to the position indicated in FIG. 5. The upstream end 56 of the deflector plate 36 is moved upwardly and to the left so as to increase the X-displacement and decrease the Y-displacement from the reference point R, as can be seen by comparing FIGS. 4 and 5.

Figure 6:
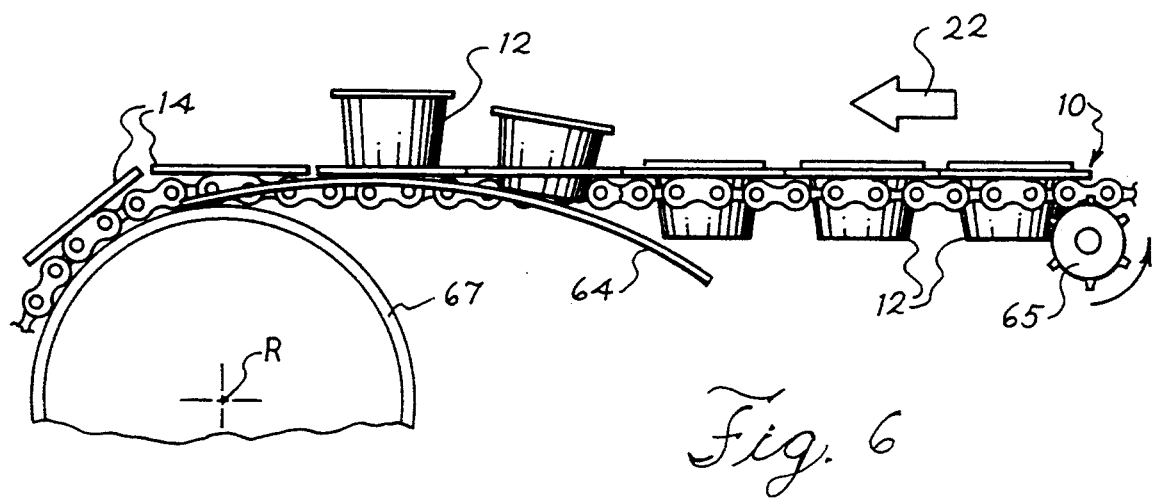
FIG. 6 is a side elevational view of conveyor apparatus according to principles of the present invention, showing a deflector plate remotely located from an end of the conveyor.

As shown in FIG. 6, the deflector plate may be located remote from an end portion of an endless conveyor belt. The deflector 64 is located at a portion of the conveyor belt oriented in general in horizontal directions. The deflector 64 raises the containers 12 at a point along the conveyor belt where pick up equipment may be located to facilitate the picking operation. It may be desirable in some instances to selectively defer picking a particular container and accordingly the deflector 64 may be employed to allow the container to continue its downstream travel on conveyor assembly 10. If desired, a second deflector, such as a deflector plate 36 or 54, could be used in conjunction with deflector 64 to clear the remaining containers in a controlled manner as discussed above. Although the deflector 64 is located adjacent the downturned end of conveyor belt 10, it will be appreciated that the deflector could be located at points remote from any such turned end, e.g., at a midpoint of a horizontal conveyor run. Lifting of the containers may be at a midpoint location helpful to assisting in a picking operation as discussed above, and also may be helpful in conjunction with a sealing operation or a container testing operation which requires equipment to be located at a distance above the conveyor plates.

The deflectors and conveyor arrangement of FIG. 6 can be employed to impart a vertical motion to the containers which is not associated with ejecting filled containers. For example, such an arrangement may be required for a filling operation in which the containers, when elevated in a vertical direction, at a filling station, interrupt a light beam which triggers a filling operation. If the containers are not elevated by a selectively movable deflector such as that illustrated in FIG. 7, the light beam is not broken and a filling operation is not initiated.

As can be seen in the right hand portion of FIG. 6, a sprocket 65 is provided to support the conveyor belt for travel in the downstream direction of arrow 22. Preferably, a plurality of sprockets including at least one drive sprocket are provided, although other conventional means for supporting and driving the belt can also be employed.

The plates 14 in FIGS. 1-6, are carried on a plurality of link chains 16. Preferably, the link chains 16 are formed in an endless loop of "race track" configuration and move in a single rotational direction. However, the link chains, with tables attached, are flexible so as to accommodate endless loops of different configurations. For example, whereas the left hand end of the conveyors illustrated in FIGS. 1-6 curve downwardly in a reverse bend so that the lower portion of the conveyor underlies the upper portion, the conveyors could be angled in a downward direction, but not a reverse bend, or could be angled in an upward direction with a return path provided at another point along the conveyor. Alternatively, the conveyor need not be an endless loop, but could travel back and forth in opposite directions so as to provide a reciprocating motion.

Further, although the conveyor of the preferred embodiment employs plates having apertures for receiving the containers, conveyors of other configurations could be used. For example, the conveyor could be formed of laterally spaced chains formed of upstanding links, with adjacent chains spaced apart so as to receive a container therebetween, with the lip of the container resting on the upper edges of the chain links. Other arrangements are, of course, possible in which the bottom portion of a container is suspended from above and is moved in a generally horizontal direction, or at least a direction having a horizontal component, so as to move the container across a deflector plate which raises the container in a vertical direction.

As described above, the containers have exposed upper portions. However, some processes may require the upper portions of the container to be confined by the conveyor, for example, between upstanding divider walls.

The conveyor belt of the preferred embodiment is passed over a roller such as the roller 67 of FIG. 6, having a center at reference point R, so that the plates 14 are rotated about a horizontal axis passing through the reference point so as to form an arcuate path portion, as shown at the left hand end of FIG. 2, for example. When employed to eject containers, the deflector plate preferably is located immediately adjacent an arcuate path portion of the conveyor belt so as to dislodge containers traveling through the arcuate path portion of the conveyor. The combined action has been found to be very effective in dislodging containers having a relatively thin wall, plastic construction filled with a heated liquid, and a consistent smooth release has been observed, without a sudden release of stored energy causing the containers to jerk and thereby spill their contents.

Figure 7:
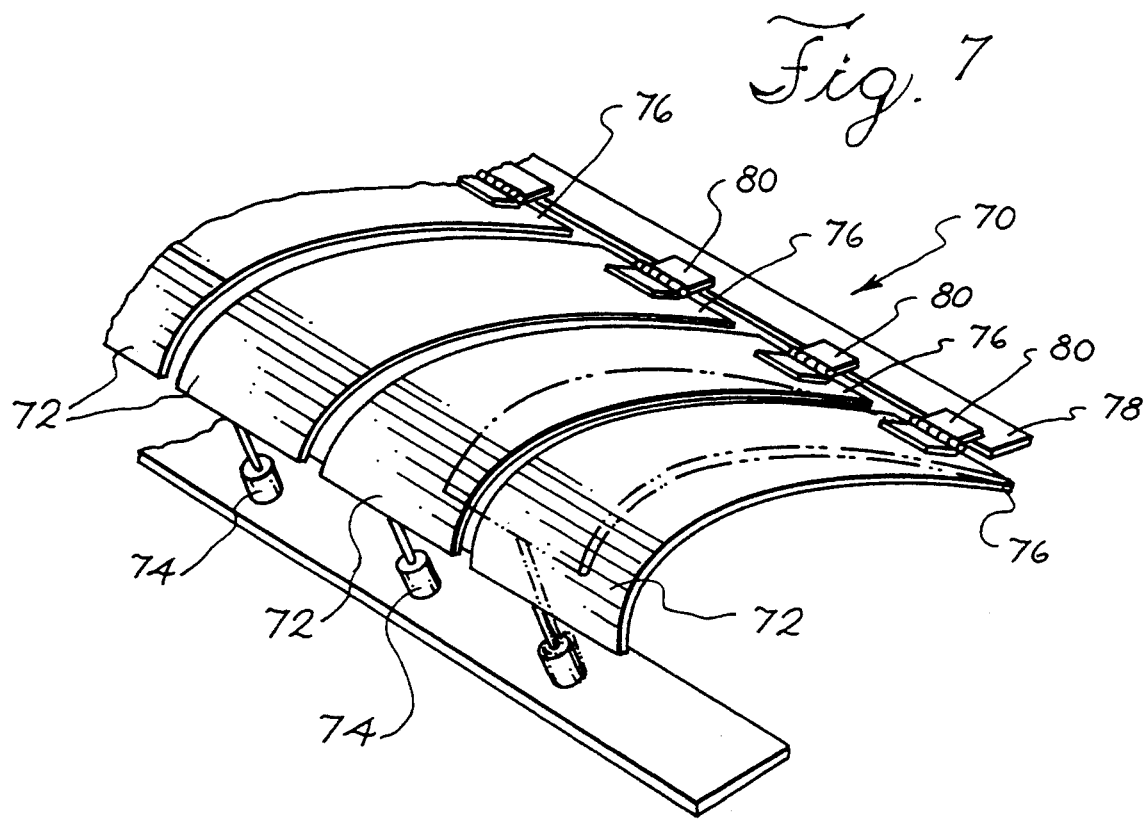
FIG. 7 is a perspective view of an alternative deflector plate.

Referring now to FIG. 7, an alternative embodiment of a deflector is generally indicated at 70. The deflector 70 is comprised of a lateral, side-by-side series of plate members 72, each of which have their own pneumatic operators 74 for individual static or dynamic adjustment, as shown in FIG. 7. The upstream ends 76 of the deflector portions are secured to a stationary mounting bar 78 by hinges 80. If desired, the hinges could be relocated to the underneath surface of the deflector men, bets to define a different center of rotation, thereby restraining the deflector members to differing paths of travel. If desired, the deflectors 72 could be operated independently so as to accommodate a plurality of adjacent parallel conveyors.

Figure 8:
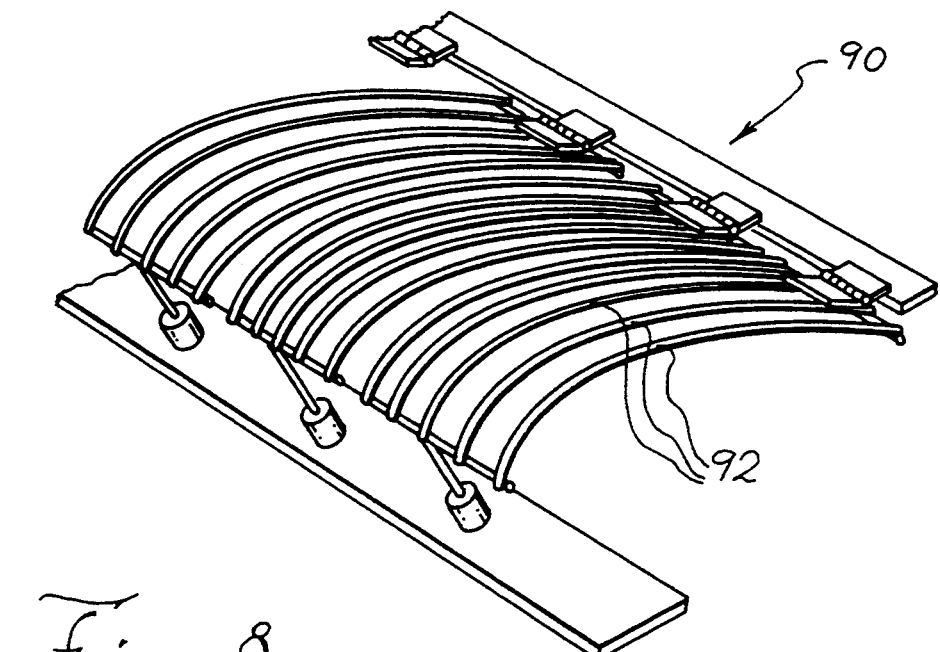
FIG. 8 is a perspective view of yet another alternative form of a deflector plate.

Referring now to FIG. 8, an alternative deflector arrangement is generally indicated at 90. Deflector 90 includes a plurality of wire members 92 which are preferably arranged in a common curved plane so as to present a discontinuous upper convexly curved surface to the containers. Use of wires and wire-like members to deflect the containers may offer advantages for containers which are relatively rigid and resistant to deformation by the wires which present a localized, high pressure area along their lines of contact with the container. If desired, deflector plates of corrugated configuration may also be employed. It is generally preferred that the deflector arrangement extend in a width-wise direction generally parallel to the conveyor, so as to be spaced generally equal distances from containers carried on a common plate, for example. If desired, however, a single plate could carry containers of different depths, and accordingly the deflector means would be divided into portions spaced different amounts from different positions on the plate.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Conveyor apparatus for use with articles having upper and lower portions, the apparatus comprising:
   a conveyor belt with a vertically inclined discharge end located between a generally horizontal support run portion and a return run portion, the conveyor belt defining a plurality of openings for receiving at least the lower portions of said articles;
   means for mounting the conveyor belt for travel in a downstream direction toward said discharge end; and
   a deflector member extending in the direction of conveyor belt travel and having upstream and downstream curved ends, with the upstream end of said deflector member having a smaller, more rapidly increasing radius of curvature followed by a more gradually increasing radius portion, said deflector member positioned beneath at least a part of the support run portion and at least a part of the discharge end of the conveyor belt so as to slidably contact the lower portions of the articles carried on the conveyor belt, said deflector member further having a curvature which gradually urges said articles out of said openings so as to remove the articles from the conveyor belt as the articles pass from the support run portion of the conveyor belt along the vertically inclined discharge end of the conveyor belt.

2. The apparatus of claim 1 wherein the deflector member is mounted for movement toward and away from the conveyor belt.

3. The apparatus of claim 1 wherein the conveyor belt defines a series of laterally adjacent openings and the deflector member underlies the series of openings.

* * * * *